Oct. 23, 1962 T. ALLAN 3,059,528
PANORAMIC MOTION PICTURE CAMERA
Filed July 2, 1957 5 Sheets-Sheet 2

INVENTOR.
TED ALLAN,
BY
ATTORNEYS.

Oct. 23, 1962  T. ALLAN  3,059,528
PANORAMIC MOTION PICTURE CAMERA
Filed July 2, 1957  5 Sheets—Sheet 3

TED ALLAN,
INVENTOR.

BY
ATTORNEYS.

Oct. 23, 1962 T. ALLAN 3,059,528
PANORAMIC MOTION PICTURE CAMERA
Filed July 2, 1957 5 Sheets-Sheet 5

TED ALLAN
INVENTOR.

BY
ATTORNEYS.

United States Patent Office 3,059,528
Patented Oct. 23, 1962

3,059,528
PANORAMIC MOTION PICTURE CAMERA
Ted Allan, 2457 N. Gower St., Hollywood, Calif.
Filed July 2, 1957, Ser. No. 669,513
8 Claims. (Cl. 88—18)

This invention relates to a novel panoramic motion picture camera and more particularly to a motion picture camera adapted to provide a photographic record of a scene of very wide angle such as 180°. The invention specifically relates to a motion picture camera capable of exposing a plurality of frames of a film strip which may be projected on a wide curvilinear screen in such a manner that an observer of the projected image is provided a sensation of being part of the scene.

Prior proposed motion picture cameras of panoramic type have been limited in the width of a scene capable of being effectively photographed and projected and in some instances visible dividing lines between portions of a projected picture made therefrom are not only evident but are required to produce a wide picture. In such prior proposed cameras the number of frames of a motion picture film capable of being exposed was relatively limited and not more than about four and one-half frames. The present invention contemplates a panoramic motion picture camera capable of exposing a plurality of frames of a motion picture film strip of standard size ( 35 mm.) as for example 7 to 9 frames with precise definition and with means whereby the cameraman can view the entire scene being photographed. The present invention obviates the disadvantages of prior proposed panoramic type motion picture cameras and includes advantages described hereinafter which will be readily apparent to those skilled in the art.

The present invention contemplates a panoramic type of motion picture camera provided with a continuously rotating lens device or assembly which includes an objective lens means and a viewing lens means rotatable about the same axis of rotation as the objective lens means. The objective lens means may include an inlet lens element lying in spaced relation, in an axial direction with respect to the axis of rotation, to an exit lens element which may expose through a slit type aperture a motion picture film strip intermittently held and positioned in a part-circular path coincident with the said axis of rotation. The viewing lens means may direct light from the scene being photographed upon a part-circular light responsive face of a television camera tube to which may be operatively connected a television receiving tube having a picture face upon which a camera may observe the scene taken and recorded on the film strip.

The primary object of this invention is to disclose and provide a novel construction and arrangement of a motion picture camera capable of making panoramic pictures of wide angle and of unusual clarity and definition.

Another object of this invention is to disclose and provide a motion picture camera in which an objective lens means is continuously rotatable about an axis and a film strip is intermittently positioned in a curvilinear path spaced from the lens means in accordance with the focal length thereof.

Another object of this invention is to disclose and provide a motion picture panoramic camera provided with novel means for supporting and intermittently moving a motion picture film strip in a curved path laterally spaced from an axis of rotation of an objective lens.

Another object of this invention is to disclose and provide a novel motion picture panoramic camera wherein an objective lens means is provided with an adjustable slit aperture.

Another object of this invention is to disclose and provide a novel compact motion picture panoramic camera wherein an objective lens means is rotatable about an axis of rotation and wherein adjustable window means are provided with relative movement in spaced relation to said axis for varying the angle of view of the continuously rotating lens means.

A still further object of this invention is to disclose and provide a motion picture camera including an objective lens means and a view finder lens means continuously rotatable about the same axis of rotation and wherein said view finder lens means is adapted to transmit light to a curved light sensitive surface on a television camera means.

A further object of this invention is to provide a panoramic type motion picture camera including a construction wherein a rotatable lens device is formed as a unitary assembly which may be readily removed and replaced to substitute lens means of different optical characteristics if desired.

A still further object of this invention is to design and disclose a panoramic type motion picture camera wherein means are provided to adjust the focus of the objective lens means during rotation of the lens device.

Another object of this invention is to disclose and provide a panoramic type motion picture camera wherein means are provided to limit or restrict the width of a window opening through which an objective lens views a scene being photographed and to enlarge said window during taking of the scene to create unusual dramatic photographic effects.

Various other objects and advantages of this invention will be readily apparent from the following description of the drawings in which an exemplary embodiment of this invention is shown.

In the drawings:

FIG. 8 is a fragmentary transverse horizontal sectional view taken in the planes indicated by line VIII—VIII of FIG. 4.

FG. 9 is a fragmentary perspective view showing means for supporting a film strip in a curvilinear path.

Generally speaking, a panoramic type motion picture camera embodying this invention indicated at 15 may include a camera housing 16 adapted to be mounted in well known manner upon a camera standard or other support means, not shown. The camera housing 16 includes a film feed or supply reel housing portion 17 and a take-up film housing portion 18 arranged in spaced parallel vertical relation. Between the film reel housing portions 17 and 18 and forwardly thereof the camera housing 16 provides a structure for mounting and supporting a continuously rotatable lens device generally indicated at 20 which may include an objective or taking lens means 21 and a view finder lens means 22 connected with the objective lens means 21 for rotation therewith. As illustrated the lens means 21 and 22 may be protected by a transparent cover 23 of any suitable material. A view finder member 24 may be located between the housing portions 17 and 18 and may be upwardly and rearwardly disposed for facilitating viewing of the scene being photographed upon a television picture tube operatively connected in a closed television system with a camera tube receiving an image through the view finder lens means 22 as described hereinafter, the picture and camera tubes being enclosed within camera housing 16.

The camera housing 16 may be of any selected shape and construction and may include in addition to the reel housing portions 17 and 18 mentioned above a forward housing portion 26 in which the rotatable camera mechanism may be enclosed. To facilitate access to the interior of the forward housing portion 26, doors 27 and 28, for example, may be provided in side walls of the forward housing portion 26. It is understood that other access means may be provided for access to the interior of the housing portion 26.

Within forward camera housing portion 26 is mounted the continuously rotatable lens device 20. The objective lens means 21 of the lens device 20 is constructed and arranged so as to be readily handled as a removable replaceable unit in the camera housing portion 26. The lens means 21 includes an outer hollow lens housing 30 (FIG. 10) of generally cylindrical form and provided with a central radially outwardly extending bearing flange 31 adapted to be seated in a circumferential recess 32 provided on a transversely extending horizontal wall 33 of the camera housing, said wall 33 being provided with a circular opening 34 for receiving therethrough a portion of housing 30. The housing 30 may also include a bottom circular end wall 36 adapted to be seated on a bottom wall 37 of and within a slit aperture carrier 38. The carrier 38 and housing 30 are interlocked for rotation together by a pair of depending non-uniformly spaced pins 39 carried by bottom wall 36 and received in aligned and registrable openings 40 provided in the bottom wall 37 of the carrier 38. The non-uniformly spaced pins provide means for precisely locating the carrier 38 relative to the lens housing so that the slit aperture will be accurately aligned with the optics of the objective lens means carried within the lens housing.

Figure 10:
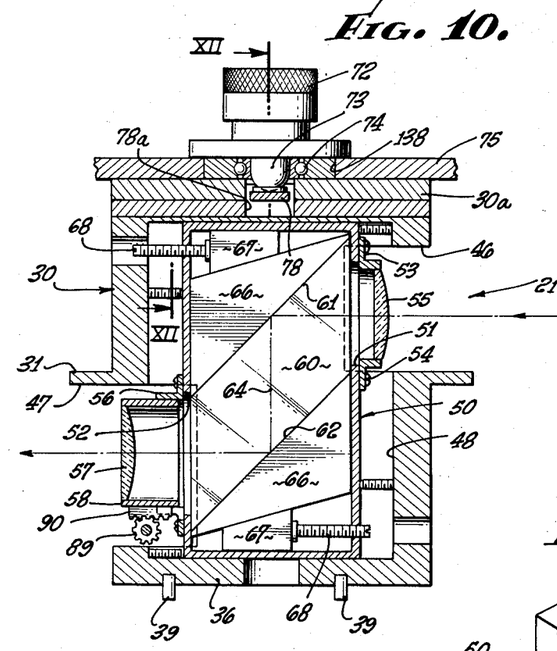
FIG. 10 is a fragmentary sectional view illustrating the rotatable lens device of this invention, the section being taken in a vertical plane passing through the axis of said device.
Figure 11:
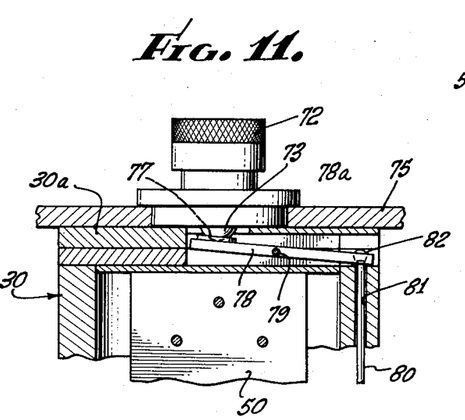
FIG. 11 is a fragmentary top sectional view of the device shown in FIG. 10, the section being taken in the plane indicated by line XII—XII of FIG. 10.

The carrier 38 may be provided with a depending central bearing boss 42 which may be supported in a bearing recess 43 provided on a horizontal transverse wall 44 of the camera housing. Thus lens housing 30 and carrier 38 are interlocked for rotation together and are supported by antifriction means in the camera housing front portion 26 on walls 33 and 34.

The lens housing 30 may be provided with an inlet opening 46 for the objective lens means and outlet opening 47, said openings 46 and 47 being arranged in axially spaced relation and in diametrically oppositely facing relation with respect to lens housing 30. The openings 46 and 47 lead to an internal lens receiving compartment 48 provided by the lens housing 30.

Within the compartment 48 may be adjustably positioned an objective lens carrying box 50 (FIG. 12), said box being of elongated rectangular form. The lens box 50 includes box openings 51 and 52 arranged in corresponding aligned relation to openings 46 and 47. Outwardly of opening 51 may be provided a lens mounting member 53 provided with a plurality of adjustable slot and screw means 54 for adjusting the position of the inlet lens element 55 of the objective lens means. Outwardly of opening 52 may be similarly provided a lens mounting member 56 which may similarly be adjustably connected to the lens box by a plurality of adjustable slot and screw mounting means such as shown at 54. An exit lens element 57 may be carried by a lens sleeve 58 which may be axially moved for adjusting the focus of the objective lens means as later described.

Figure 12:
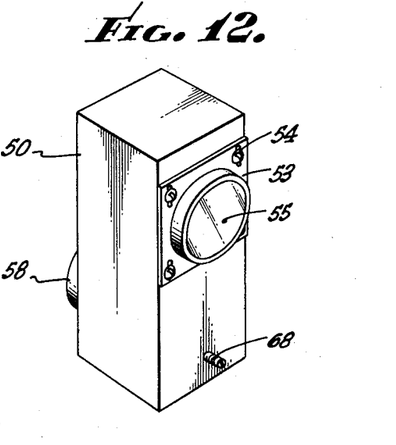
FIG. 12 is a perspective view of a removable lens box associated with the rotatable lens device shown in FIG. 10.

Within the lens box 50 may be mounted prism means 60 of suitable optical material and provided with an inclined reflecting prism face 61 and an opposed inclined reflecting prism face 62. The prism faces 61 and 62 are so arranged with respect to lens elements 55 and 57 that the optical axis of lens element 55 is aligned optically with the optical axis of lens element 57 through a vertically extending optical axis of light path portion 64 which may approximately coincide with the axis of rotation of the lens device 20.

The prism 60 may be selectively optically aligned within lens box 50 by means of suitable wedge members 66 and 67 arranged in cooperative relation within the lens box, wedge members 66 being bonded or cemented to surfaces of the prism 60 and each presenting an inclined face to wedge member 67. Each wedge member 67 is movable by turning a threaded screw member 68 which projects through a threaded opening in the wall of the lens box for facilitating adjustment of the position of the wedge member.

Means for positioning and aligning lens box 50 within the lens housing 30 so as to selectively and rigidly mount the lens box therein may be readily provided by a plurality of sets of top and bottom pairs of set screws 70 extending through threaded bores in cylindrical wall of the lens housing 30 to provide engagement with an opposite wall of the lens box 50, the sets of top and bottom pairs being spaced 90°. It will be readily apparent from a consideration of FIGS. 8 and 10 that the lens box 50 may be moved laterally with respect to the optical axes of the lens elements 55 and 57 and may also be moved longitudinally relative to said optical axes so as to properly position the objective lens means with respect to the slit aperture 100 and to the curvilinear path of a film strip portion so that the precise back focal distance from the objective lens means to the film strip portion may be provided.

Figure 7:
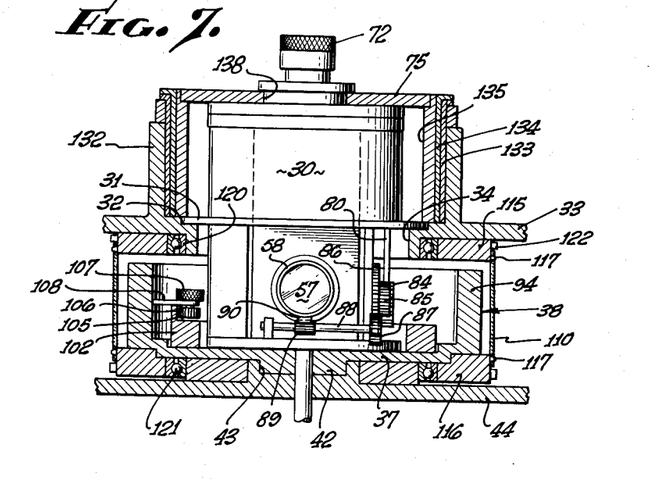
FIG. 7 is a fragmentary sectional view taken in the vertical plane indicated by line VII—VII of FIG. 4 and showing lens focus adjustment means.

Means are provided to adjust the focus of the objective lens means during rotation of the lens device 20. The focus adjustment means includes an external top adjustment knob 72 having its axis coincident with the axis of rotation of the lens device. The knob 72 is connected to an axially movable depending stem 73 mounted in a top horizontal wall 75 of the camera housing. The stem 73 may be provided with a semi-spherical bottom end 76 which may bear in a partially spherical recess 77 provided at one end of a toggle link 78. Link 78 may be pivotally mounted at 79 between its ends in a radially extending recess 78a formed in top wall 30a of lens housing 30. At its outer end link 78 may be connected and secured to a vertically extending rod 80 reciprocally movable in a vertical passageway 81 in a wall of the lens housing 30. The connection between the top end of rod 80 and the end of link 78 may be of ball and socket type as indicated at 82. The lower end of rod 80 may carry a vertically disposed rack element 84 having teeth meshed with a gear 85 mounted for rotation about a horizontal axis and carried in a recessed portion of the cylindrical wall of the lens housing 30. Also mounted for rotation about the axis of gear 85 is a larger gear 86 having meshed engagement with a pinion 87 mounted on the end of a transversely extending shaft 88 carried by the lens housing 30. Intermediate ends of shaft 88 may be provided a gear 89 having meshed engagement with a rack element 90 carried on the bottom of the lens sleeve 58 in longitudinal extending relation therewith.

When knob 72 is turned so as to cause axial movement of stem 73, toggle, toggle link 78 is moved about its pivotal axis 79 to cause either raising or lowering of rod 80 and rack element 84 carried thereby. Such axial movement of rack element 84 produces rotation of gear 89 through the gear train 85, 86 and 87 so as to cause movement of the lens element 57 and lens sleeve 58 along the optical axis thereof to provide adjustment of the focus of the objective lens means.

The rotatable lens device 20 as mentioned above includes lens housing 30 and interconnected carrier 38 so that the slit aperture provided for the objective lens means may rotate with the objective lens means in alignment therewith. Means for adjusting the slit aperture and its construction is now described. The aperture carrier 38 includes an upstanding cylindrical wall 94 concentric with the axis of lens housing 30. Cylindrical wall 94 (FIG. 5), may be provided with an opening 95 centered with respect to the optical axis of lens element 57. Aperture plates 96 for adjustably closing opening 95 may be slidably mounted in cylindrical wall 94 at each side of opening 95. Each aperture plate 96 is mounted in a vertical plane disposed at an acute angle to a vertical plane passing through the optical axis of lens element 57. Edge face 97 of each aperture plate 96 may be beveled with respect to plate 96 so as to lie in a plane parallel to the optical axis of lens element 57. Each aperture plate 96 may include at its other end a rack portion 98 in meshed engagement with a rack gear 99.

Figure 5:
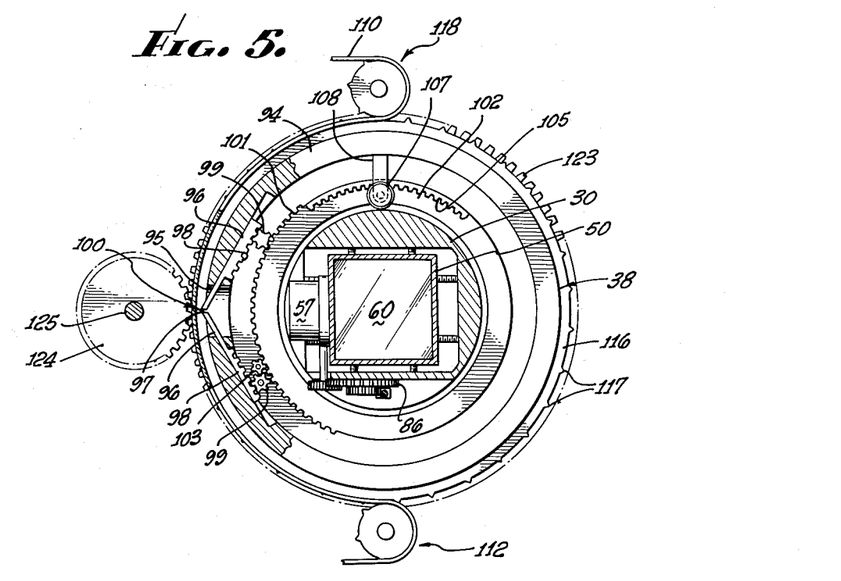
FIG. 5 is a transverse horizontal sectional view taken in the plane indicated by line V—V of FIG. 4.
Figure 6:
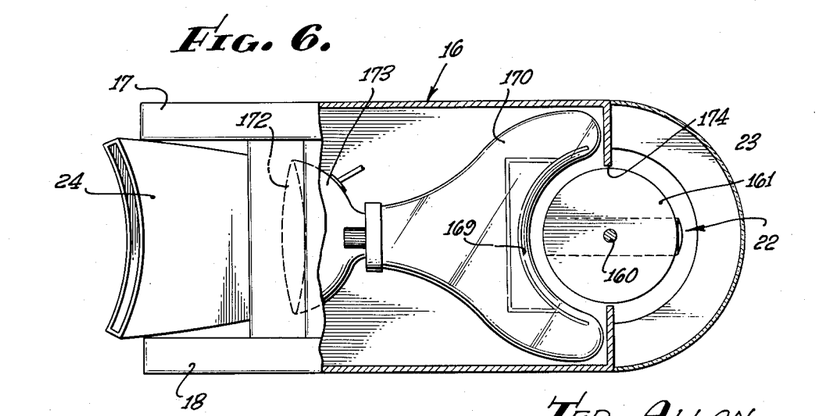
FIG. 6 is a plan view partly in section, the section being taken in a horizontal transverse plane indicated by line VI—VI of FIG. 4.

To provide simultaneous equivalent motion of aperture plates 96 so as to vary the width of slit aperture 100 provided between edge faces 97 uniformly with respect to the optical axis of lens element 57, one of each of the rack gears may provide direct meshed engagement with an arcuate gear portion 101 carried along an upper circumferential margin of an annular member 102 carried concentrically with carrier 38 and mounted for rotation relative thereto. The other rack gear 99 may be meshed with an idle gear 103 provided with meshed engagement with arcuate teeth 101 on the member 102. The member 102 may also be provided with an internal arcuate set of teeth 105 which may be meshed with a pinion gear 106 carried by an adjustment knob 107 carried in a bracket 108 on carrier 38. It will be readily apparent that by turning knob 107 the member 102 is rotated and the aperture plates 96 are slidably moved towards or away from each other to vary the width of slit aperture 100. Aperture adjustment knob 107 is readily accessible when the lens housing is removed from the camera housing by simply inserting a suitable tool through the opening 34 provided in the camera housing.

It will be understood that aperture plates 96 may be adjusted without removal of the lens housing 30 by adjustment means extending externally of the lens device 20 so that such adjustment means may include a rack element and vertically extending rod passing through a passageway in the cylindrical wall of the lens housing for connection to a pivoted link and axially movable stem such as described and illustrated for adjustment of the focus of the lens.

It will thus be apparent that lens means 21 carried in lens housing 30 may be removed from the front camera housing portion 26 by removing top wall 75 which may be secured in assembly to the housing portion 26, said top wall 75 carrying with it the knob 72 and stem 73. The toggle link 78 together with the rod 80 and cooperable gear train are removed in assembly with the lens housing 30, the register pins 39 being disconnected with the bottom wall of the carrier 38 upon lifting the lens housing 30 upwardly. After the lens housing 30 is removed from the camera housing, the top wall 30a of the housing 30 may be removed so that lens means of different optical characteristics may be substituted therefor and readily reassembled with the lens housing 30.

Figure 1:
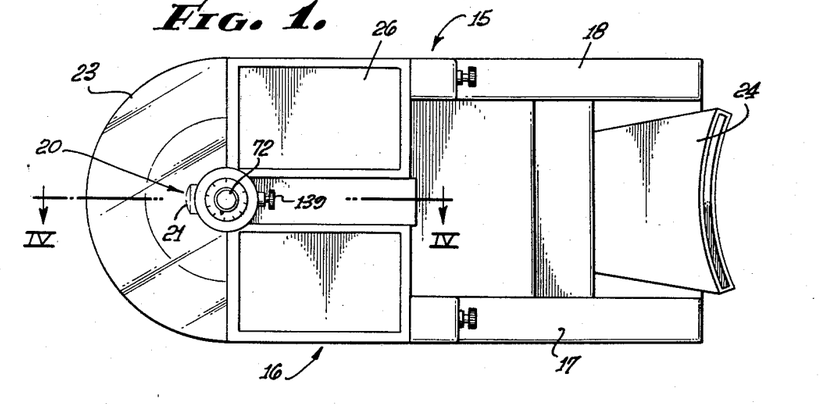
FIG. 1 is a top plan view of a panoramic type motion picture camera embodying this invention.
Figure 2:
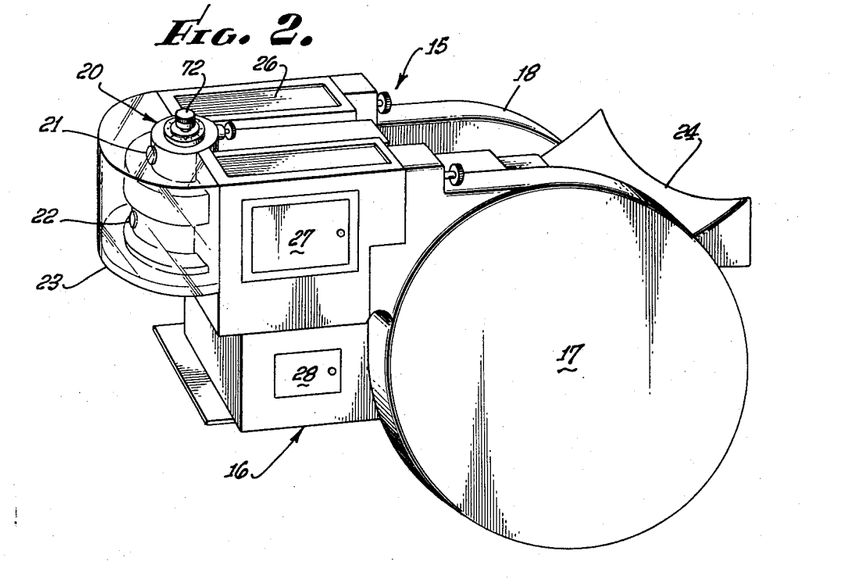
FIG. 2 is a perspective side view of the camera shown in FIG. 1.
Figure 3:
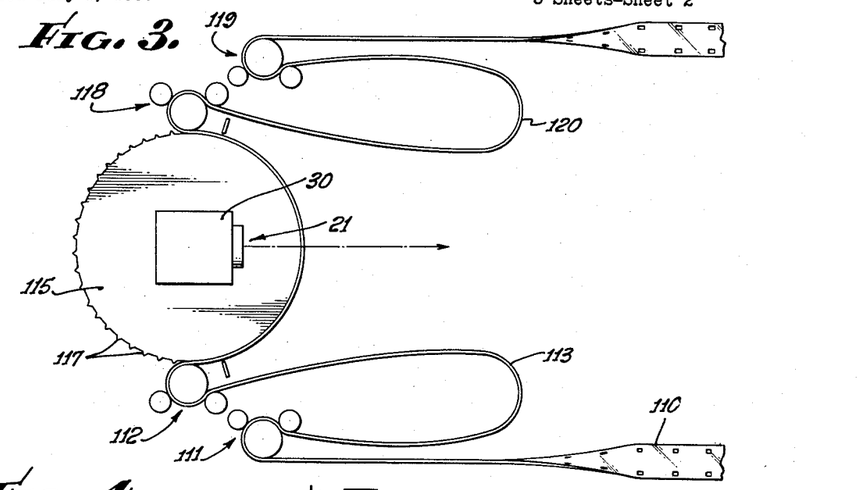
FIG. 3 is a diagrammatic view showing the path of a motion picture film strip provided in the camera shown in FIG. 1.
Figures 8, 9:
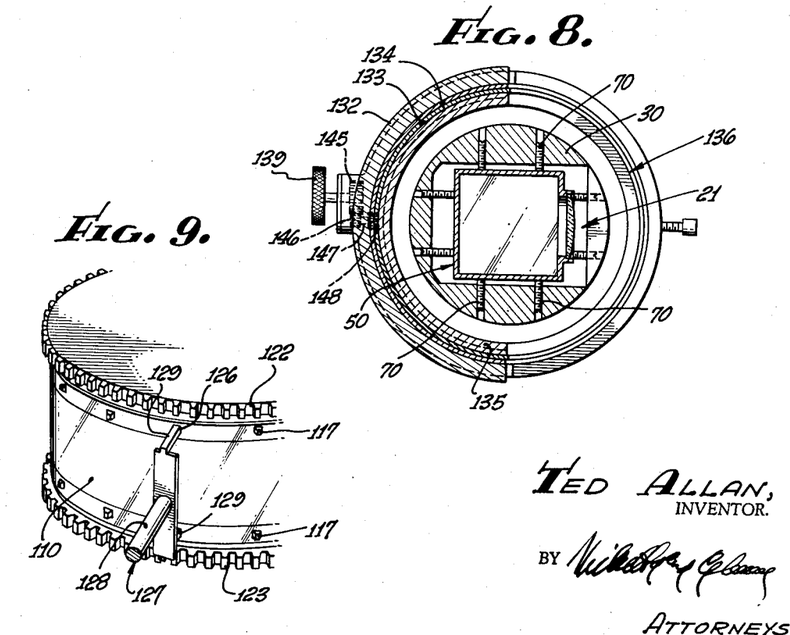

Film support means for a motion picture film strip 110 are shown in FIGS. 3, 5 and 9. Film strip 110 may be carried on a motion picture film reel of well known construction (not shown). In reel housing portion 17, film strip 110 may be drawn off the top of such a film reel and then twisted 90° (FIG. 3), so as to pass and thread said film strip about a plurality of infeed sets of roller guides 111 and 112 of well known construction to provide a slack loop 113. The sets of guides 111, 112 may be mounted in suitable manner from the camera housing in a horizontal planar zone which may include the exit lens element 57. As the film strip leaves the set of guides 112, it is fed onto a pair of vertically spaced top and bottom film support rings 115 and 116. Each of said film support rings includes a composite circumferential face provided adjacent one edge with circumferential sprocket teeth 117 spaced so as to mesh with usual sprocket holes provided on opposite longitudinal edge margins of the film strip. It will be noted that the film strip extends around the rings 115 and 116 for approximately 180° and at the opposite discharge side of the rings a plurality of sets of film guides 118 and 119 are provided to form a film slack loop 120 and to guide the film strip onto the film take-up reel in the reel housing portion 18.

Each film support ring 115 and 116 may be of identical and of relatively large diameter as for example 5″. Each film support ring 115 and 116 provides a curvilinear or virtually semi-circular film supporting surface for film strip 110 so that said film strip lies at a predetermined selected focal distance from the objective lens means 21. It may also be noted that the semi-circular or curvilinear path upon which the film strip is supported is coincident with the axis of rotation of the lens device. Each of said film support rings 115 and 116 may be anti-frictionally mounted as by suitable bearing means 120 and 121 on walls 33, 44 so that the rings may be simultaneously and free rotatable about the axis of rotation of the lens device.

Means for intermittently driving the film support rings 115 and 116 may include external outwardly directed ring teeth 122 and 123 provided on the ring members in spaced relation to sprocket teeth 117. The external teeth 122 and 123 are provided meshed engagement with vertically spaced drive wheels 124 carried on a shaft 125 which may be mounted for rotation in camera housing walls 33 and 44. The shaft 125 is intermittently driven in timed relation with the rotation of the lens device 20 in order to retain and hold a film strip portion stationary in the curvilinear path for exposure thereof as the objective lens means is rotated. After the film strip portion has been exposed and during the time the objective lens means is not viewing a scene, shaft 125 is driven so as to move the exposed film portion out of the exposure area and to move a new unexposed film portion into said area. The means for intermittently driving shaft 125 in timed relation with rotation of the lens device is not shown because it does not form part of this invention and is well known in motion picture camera art.

It is important that the film strip, when it is positioned for exposure in the curvilinear path, be snugly held at its side margins against the circumferential faces of film support rings 115 and 116 so that each incremental portion of the film is precisely located at the preselected focal distance of the objective lens means. In order to accomplish such precise positioning of the film strip without usually provided backing or support plates, at selected spaced intervals sprocket teeth 117 are omitted and instead vertically aligned holes 126 of selected size are provided in rings 115 and 116. As best shown in FIG. 9, the film strip portion is drawn snug against the circumferential edge margins of rings 115 and 116, by film register pin means 127 which may include a reciprocally movable shaft 128 provided at one end with vertically spaced register pins 129, said pins 129 each having an end configuration which completely fills a sprocket opening in the film strip so that any slack is eliminated which normally exists between the sprocket teeth 117 and the sprocket openings in the film strip. The means for reciprocally actuating register pin means 127 in timed relation with the intermittent movement of the film support means is not shown because it does not form a part of this invention and is well known in the art.

Figure 4:
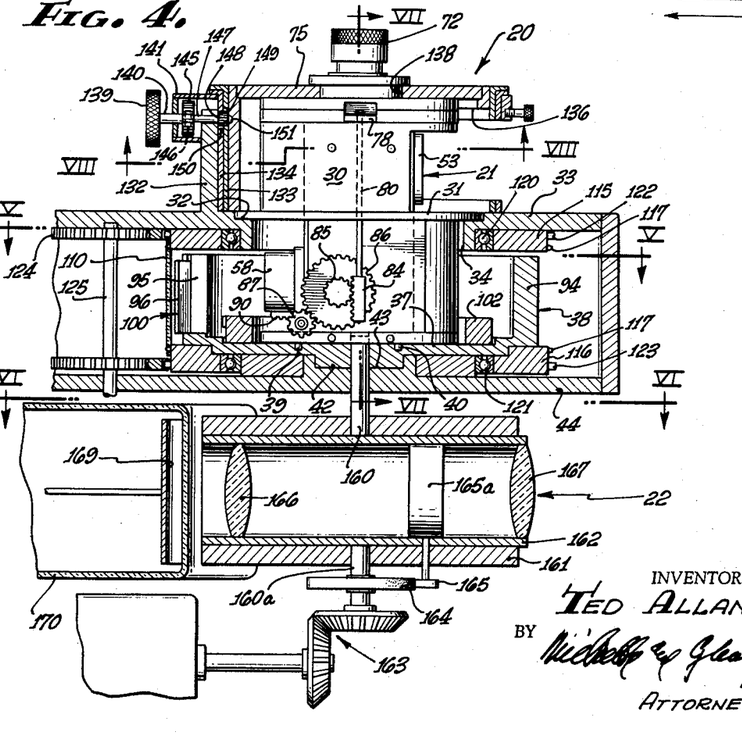
FIG. 4 is a partial sectional view of the camera shown in FIG. 1, the section being taken in a vertical plane as indicated by lines IV—IV of FIG. 1.

Means are provided for adjustably varying the size of a window opening 136 in the camera housing for limiting or enlarging the subtended angle of view of the objective lens means as it is rotated. In FIGS. 4, 7 and 8, the camera housing includes a fixed semi-circular upstanding wall 132 integral with camera housing wall 33 and concentric with the axis of rotation of the lens device. Within the semi-circular wall 132 may be slidably mounted a pair of generally semi-circular nested relatively movable window closure members 133 and 134. Within the nested window closure members 113 and 134 may be provided a generally cylindrical wall 135 secured to wall 33 of the housing and defining the semi-circular window opening 136. Removably secured to wall 135 may be top wall 75 which includes a central opening 138 receiving bearing means 74 and above which is located focusing adjustment knob 72.

Means for simultaneously moving each of the closure members 133 and 134 so as to symmetrically close or open window opening 136 may comprise an actuating knob 139 provided with a shaft 140 mounted in a shaft housing 141 and carrying within the housing an enlarged gear 145 and a pinion gear 146 which provides a gear reduction to a countershaft 147. Countershaft 147 at its inner end is provided with a pair of or dual gear teeth 148, one of said pair of teeth 148 being engaged with teeth on the upper edge of a slot 149 in said closure member 133 and the other of said pair of gear teeth 148 being engaged with teeth on the lower edge of a slot 150 on closure member 134. As the knob is turned closure members 133, 134 will simultaneously move in opposite directions and close or open the window opening 136. The end of shaft 140 may be received within a circumferential groove 151 provided in wall 135 of the camera housing. It should be noted that the knob 139 is not only rotatable to close and open the closure members 133 and 134 but may also be moved relative to wall 132 with members 133 and 134 in selected spaced relation so that a cameraman may pan the scene being photographed through a window opening of selected size and then at a selected moment enlarge or decrease the width of said window opening during panning to create an unusual photographic effect.

View finder means associated with the rotatable lens device may be provided by mounting view finder lens means 22 for rotation about the same axis as the objective lens means 21. Referring to FIG. 4, it will be noted that shaft 160, which is mounted in camera housing wall 44 and which is keyed to carrier 38 to cause rotation thereof and of lens means 21, is connected beneath wall 44 to a view finder lens housing 161 which may include a lens sleeve 162 carrying lens elements of the view finder lens means 22. The shaft 160 includes a shaft portion extending below the view finder lens means 22 and is illustrated as connected to a gear means 163 which may be driven by a suitable motor for rotating the shaft 160. Such a motor and gear means are diagrammatiaclly shown since such is well known in the art and it is contemplated that the shaft may rotate at a speed providing a correlated rate of movement of the film strip of approximately 20 frames per second.

Shaft portion 160a may carry a cam member 164 having a cam surface along which a cam follower 165 may rollingly contact, said cam follower being connected to a lens shutter or stop means diagrammatically indicated at 165a. When back lens element 166 is scanning a scene being photographed, the cam member 164 and cam follower 165 actuate the shutter means 165a so that no light is transmitted through lens means 22. When front lens element 167 of the view finder lens is scanning the scene being photographed, light is transmitted through the view finder lens means and is directed upon a light sensitive and responsive surface 169 of a television camera tube 170 of suitable type and manufacture such as an image orthicon or vidicon tube. The light responsive face 159 is arranged in a curvilinear path of generally semi-circular configuration corresponding to the semi-circular path along which a portion of the film strip is held during exposure. Thus, light impinging upon the curvilinear light responsive face 169 of the television camera energizes said camera tube so that through a closed television circuit (not shown), the image observed thereby will be reproduced upon a picture face 172 of a television receiving tube 173 carried within the camera housing. The picture face 172 may be seen through the view finder member 24 and reproduces the scene being viewed by the objective lens.

The view finder lens means 22 is capable of scanning or viewing a scene of approximately 180° simultaneously with the objective lens means. The invention contemplates that the angle subtended by the path of movement of the view finder lens may be varied in accordance with the opening and closing of the window closure members 133 and 134 for the objective lens 21 so that the scene viewed by the cameraman will be identical to that produced by the view finding lens. Closure members, not shown, similar to members 133, 134 may be provided at the view finding lens and may be correlated with the opening and closing movement of members 133, 134 by any suitable interconnecting mechanical means.

Operation of the panoramic type motion picture camera described above will be readily understood by those skilled in the art. A film strip 110 mounted in the feed reel housing portion 17 may be readily threaded through the sets of guides 111, 112 and 118, 119 and positioned on the sprocket teeth of the rings 115 and 116 so that the film strip includes a portion positioned in a curvilinear or semi-circular path. A suitable adjustment may be made of the width of the slit aperture 100 by actuating knob 107. The rotatable lens device 20 with a lens box 50 having objective lens means 21 of selected characteristics may then be positioned in the camera housing. The window closure members 133, 134 may be adjusted to a desired angle of view.

When the driving motor is energized so as to continuously rotate the lens device 20 in one direction it will be readily apparent that both the view finder lens means 22 and the objective lens means 21 are aligned and view virtually the same scene being photographed. Light from the scene transmitted by the lens element 55 is directed through the prism 60 to the exit lens element 57 and thence to a portion of the film strip 110 carried by and positioned by the intermittently actuatable film support rings 115 and 116. Focusing of the objective lens is readily accomplished by turning of knob 72 so that the rear lens element 57 is moved slightly along its optical axis so that a clear definitive image is produced on the film strip portion lying in a curvilinear path. As the slit aperture transmits the light to the light sensitive surface of the film strip an incremental vertical element of the film strip is exposed and successive exposure of such incremental film strip elements is produced as the objective lens scans the width of the window opening defined by the window closure members 133 and 134. After the lens device reaches a selected position in its rotation film registration means 127 are actuated so as to withdraw registration pins 129 from the rings 115 and 116. As soon as the registration pins are withdrawn the sprocket wheels 124 are caused to rotate and to drive the rings 115 and 116 so that the film strip is positively moved out of the path of the objective lens means and a new unexposed film strip portion is positioned and positively retained in said path in time for the next viewing of the scene by the objective lens 21. The scene meanwhile being photographed is viewed by the cameraman through the view finding means on the face of the television receiving tube and such scene corresponds with that being photographed because of the simultaneous coincident rotation of the view finder lens means 21 with the objective lens means.

It is important to note that the exposed film strip portion includes a record of the scene photographed which is unbroken, uninterrupted, and continuous. When such a film strip is processed, printed and projected upon a curvilinear screen a dramatic sensation of depth and of being part of the scene is created in an audience viewing the picture.

It will thus be readily apparent that the panoramic type motion picture camera described above includes a novel construction in the manner of supporting and accurately positioning a portion of a film strip during exposure thereof, and that the continuous rotation of the lens device produces through the slit aperture a continuous successive incremental exposure of the film sensitive surface so as to produce unusually clear and definitive images. The width of the scene being viewed may be readily varied during the photographing of a scene so as to emphasize or de-emphasize selected portions of the wide scene so that unusual photographic effects may be produced. The panoramic type picture produced by the camera of this invention when projected upon a curvilinear screen produces unusual effects of depth and three dimension.

While the embodiment of the invention described above shows a camera construction providing for exposure of a film strip through about 180°, it will be readily understood that the camera housing may be modified so that the opening 46 may be enlarged to approximately 360° and the film to be exposed may likewise be supported within the camera housing on the ring members 115, 116 in an arc of approximately 360° so that the objective lens may be operative to produce such a picture encompassing almost 360°. In such camera construction, the semi-circular wall 132 would be substantially eliminated and likewise the window members would be removed. Such sweeping of a film strip on the members 115, 116 is readily facilitated because of the independent film support means provided thereby. However, while such a modification of the camera construction may be readily made it should be noted that the lateral extent of the periphery of vision of the human eye is approximately 180° and such extension of the camera vision to almost 360° would be used to provide unusual photographic effects and for special training purposes as for testing reaction of combat pilots.

It may also be noted in the embodiment of this invention that the objective lens means may not be provided with shutter means because the semi-circular wall 132 and closure members 133 and 134 provide means for preventing light from entering the lens element 55 after it has rotated past the window opening 46. The internal surfaces of wall 132 may be treated with a non-light-reflecting coating in well-known manner.

While the above description indicates generally that the view finding lens means 22 may be limited in the width of the scene being viewed to correspond with the opening or closing of the closure members 133, 134 by mechanical means, it will be readily understood that actuation of the window closure members 133, 134 to a selected position may be transmitted electronically to the television camera means 170 so as to limit the light-responsive characteristics of the plate 169 by means of well-known gating circuits so that the scene transmitted to the plate 169 may correspond to the scene observed by the objective lens means.

It will be readily understood by those skilled in the art that various modifications and changes may be made in the construction of the rotatable lens device and in the arrangement of the television view finder means used in combination with said motion picture camera. It is contemplated that unusual wide vista television effects may be produced by a modified camera in which the objective lens means is used to transmit light to a light sensitive curvilinear face of a television camera tube so that a panoramic type television camera is provided.

All changes and modifications which come within the spirit of this invention and which come within the scope of the appended claims are embraced thereby.

I claim:

1. In a motion picture panoramic camera, the combination of: a camera housing; a lens device mounted in said housing for continuous rotation about an axis of the housing, said lens device including an objective lens means and a finder lens means each rotatable about said axis in coaxial relation therewith; means within the housing including freely rotatable film support rings with sprocket teeth circumaxial with respect to said axis for intermittently movably supporting a film strip in a part circular path virtually coincident with said axis of rotation of said lens device and positioned at a focal plane of said lens system; means associated with the rotatable lens device for providing a slit aperture proximate to said film strip and adjacent the exit pupil of the objective lens means; means for adjustably focusing said objective lens means during its rotation; means carried by the housing providing an adjustable window for said rotating objective lens means; view finder means cooperably associated with said finder lens means and including a television camera provided with a light sensitive surface lying in a curved path coincident with said axis to receive light transmitted by said rotatable finder lens means, and a television receiving means connected to said television camera for reproducing an image transmitted by said finder lens means.

2. A camera as stated in claim 1 wherein said slit aperture means includes a pair of aperture plates carried by the rotatable lens device, said lens device having a ring member provided with convergingly directed slots, aperture plates guidably supported in said slots, and means carried by said lens device for moving said aperture plates toward and away from each other.

3. In a motion picture panoramic camera, the combination of: a camera housing provided with a pair of spaced window openings; a rotatable assembly mounted within said housing and including an objective lens means cooperable with one of said window openings and a view finder lens means cooperable with the other of said window openings and coaxially related and spaced from the objective lens means, said rotatable assembly including slit aperture means; means for adjustably focusing said objective lens means during its rotation; means mounted within said housing including film support rings coaxial with said rotatable assembly for intermittently movably carrying a portion of a film strip in a part circular path and rotatable relative to and about said assembly and cooperably positioned with respect to said objective lens means; and view finder means including a television system comprising a curved light sensitive surface coaxial with the axis of rotation of the view finder lens means and operable to receive light from said view finder lens means and to reproduce images transmitted thereby.

4. In a motion picture panoramic camera, the combination of: a camera housing provided with a chamber and a longitudinal axis, said housing including a window opening at one end of the chamber to admit light perpendicular to said axis; a lens device received within said chamber and having an objective lens means operably positioned with respect to said opening to receive light therefrom and to direct light to the other end of said chamber and in a direction diametrically opposite to said opening; a pair of annular film support rings antifrictionally mounted in coaxial relation to said longitudinal axis and within said housing at the said other end of said chamber for carrying a film strip in a part circular path to receive light directed from the objective lens means; aperture means carried by the lens device between the objective lens and the film strip; means for adjustably focusing said objective lens means during its rotation; means carried by the housing to continuously rotate the lens device about said longitudinal axis; and means carried by the housing in engagement with said film support rings for intermittently moving the support rings in cooperable relation with the rotation of the lens device.

5. In a camera as stated in claim 4 wherein each film support ring is provided with circumferentially arranged spaced teeth and spaced holes in circumferential alignment with said teeth, said teeth being adapted to engage certain of the perforations in a film strip, and spaced register pins movable as a unit within the housing for cooperable engagement with said spaced holes in said support rings for positively positioning the film strip in said part circular path.

6. A camera as stated in claim 4 wherein said means for adjusting focus of the objective lens means includes an external actuator knob located at said longitudinal axis, a lever pivotally mounted in the lens device and extending radially from said axis, and rack and gear means connected to said lever and to said objective lens means.

7. A camera as stated in claim 4 including a view finder lens means connected with said lens device for simultaneous rotation therewith about said longitudinal axis, and means providing a light sensitive curved surface at the focal length of said view finder lens.

8. A camera as stated in claim 4 including means to converting the image produced at said curved surface to a planar surface for optically viewing said image.

References Cited in the file of this patent
UNITED STATES PATENTS

| | | |
|---|---|---|
| 866,257 | Case | Sept. 17, 1907 |
| 1,143,607 | Brigden | June 22, 1915 |
| 1,181,201 | Akeley | May 2, 1916 |
| 1,196,066 | Aberini | Aug. 29, 1916 |
| 1,783,463 | Elms | Dec. 2, 1930 |
| 1,834,908 | Wall | Dec. 1, 1931 |
| 2,068,410 | Hanke et al. | Jan. 19, 1937 |
| 2,438,137 | Waller et al. | Mar. 23, 1948 |
| 2,538,910 | Miller | Jan. 23, 1951 |
| 2,596,746 | Waller | May 13, 1952 |
| 2,683,816 | Bouwers | July 13, 1954 |
| 2,698,356 | Roos | Dec. 28, 1954 |
| 2,709,391 | Reeves | May 31, 1955 |
| 2,717,542 | Shing Riu Liu | Sept. 13, 1955 |
| 2,782,699 | Vanderhooft | Feb. 26, 1957 |
| 2,796,799 | Strauss | June 25, 1957 |
| 2,808,768 | Squassoni | Oct. 8, 1957 |
| 2,815,701 | Back et al. | Dec. 10, 1957 |
| 2,844,069 | Azarraga | July 22, 1958 |
| 2,863,713 | Mito | Dec. 9, 1958 |

FOREIGN PATENTS

| | | |
|---|---|---|
| 788,158 | France | July 22, 1935 |